United States Patent
Gutekunst

[11] 4,258,473
[45] Mar. 31, 1981

[54] DANDELION WHIP

[76] Inventor: Rosella E. Gutekunst, 1312 Porter, Apt. 63, Dearborn, Mich. 48124

[21] Appl. No.: 972,970

[22] Filed: Dec. 26, 1978

[51] Int. Cl.³ .............................................. B26B 3/00
[52] U.S. Cl. ..................................................... 30/318
[58] Field of Search .................................. 30/309, 318

[56] References Cited
U.S. PATENT DOCUMENTS

| | | | |
|---|---|---|---|
| 1,760,024 | 5/1930 | Sydnor | 30/318 |
| 1,784,163 | 12/1930 | Stauverman | 30/318 |
| 1,878,689 | 9/1932 | Flack | 30/318 |
| 1,933,625 | 11/1933 | Hovland | 30/318 |
| 2,033,797 | 3/1936 | Whitney | 30/318 |
| 2,070,041 | 2/1937 | Coe | 30/318 |
| 2,564,477 | 8/1951 | Goodpasture | 30/318 |
| 2,787,058 | 4/1957 | Vogel | 30/318 |

Primary Examiner—Othell M. Simpson
Assistant Examiner—J. T. Zatarga

[57] ABSTRACT

This small hand operated yard tool is designed and invented specifically for the individual home owner to cut off dandelion flowers from their lawns. The tool consists of a four by six and one-half inch blade with a double edged row of triangular shaped cutting prongs, attached to a short 32 inch inverted T shaped handle, that when held in an adult's hand by their side reaches down toward the ground to just above ground level. When said blade is swung forward and backward underneath the dandelion flowers it cuts and snaps them off, thus removing said blemish from the lawn and diminishing future outcrops of the weed.

3 Claims, 1 Drawing Figure

DANDELION WHIP

BRIEF SUMMARY OF THE INVENTION

This invention is a hand-operated cutter tool consisting of an inverted T shaped handle and a double-edged cutting blade that is held by one's side and swung forward and backward to snap off the flowers and buds of dandelions, thus removing that blemish from the lawn of homes. For flowers that are close to the ground it can be used with a picking action.

It is also the purpose of this invention to provide a handle that is only about thirty-two inches in length, with a blade six and one-half inches long and four inches wide including the 13 triangular shaped prongs on each side of the blade, thus making said invention small, lightweight, and easy to handle.

Furthermore, it is the object of this invention to provide a cutter that catches the dandelion flowers between the narrow openings of the blade, pulling and cutting them off their stems, thus removing the blemish that would otherwise turn to seed and spread.

BRIEF DESCRIPTION OF THE VIEWS OF THE DRAWING

In order that my invention may be better understood, I will now proceed to describe the same with reference to the accompany drawing, wherein:

The FIGURE is a perspective view of the separated main parts of the hand operated tool.

DETAILED DESCRIPTION

Figure 1:
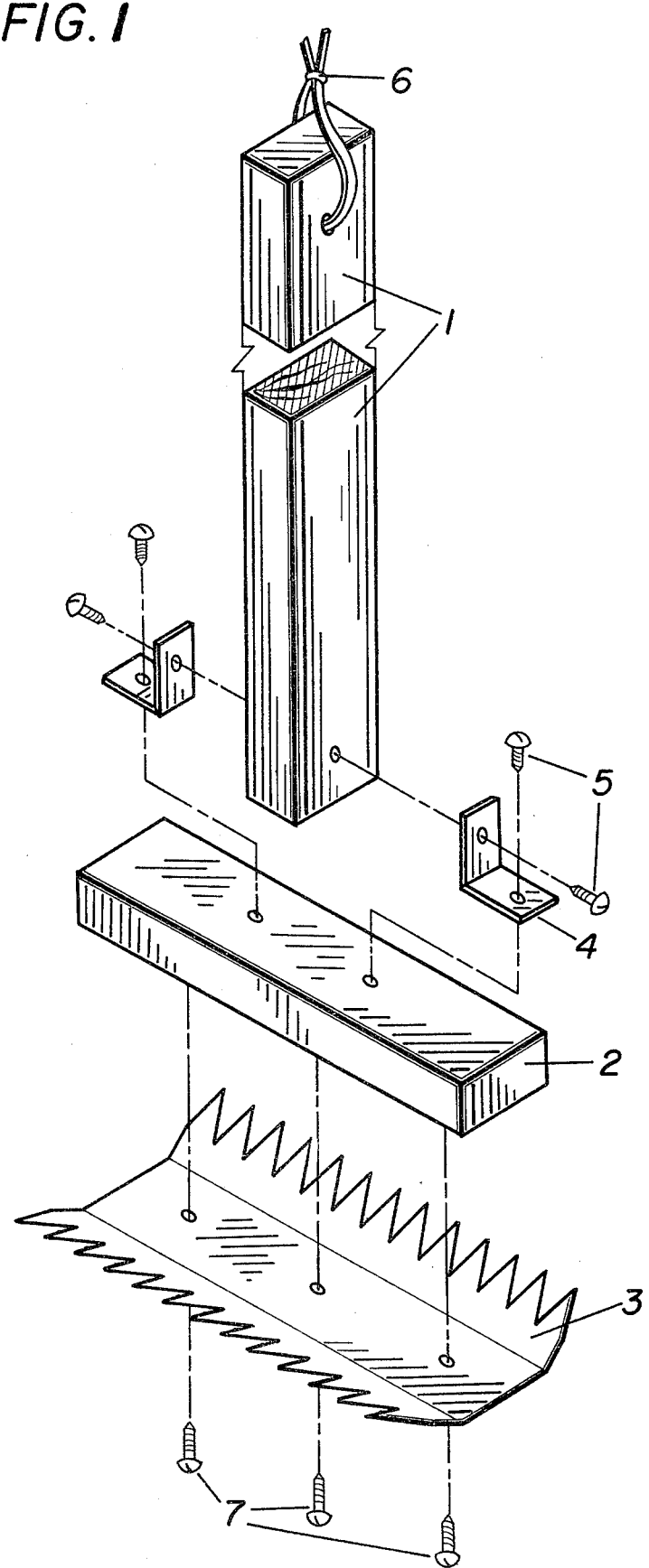

In the embodiment of the invention as illustrated in the accompanying drawing, like reference characters refer to like parts.

The rigid wood rectangular handle 1 is about 32 inches in length, (full length of handle not shown), one and one-half inches wide and ¾ of an inch thick.

The wooden base or crossbar 2 at the base of the handle will accommodate the blade. Said wooden base is also rectangular in shape, six and one-half inches long, one and one-half inches wide and ¾ of an inch thick.

The blade 3 is made of thin (#30 gage) sheet metal steel; it is six and one-half inches long, and four inches wide (counting the 13 prongs on each side). After said blade is cut to its' proper size and shape and attached to the base of the handle, said blade is pressed against a hard surface to curve each blade section upwards about five degrees (5°) from the wooden base. The center uncut space on blade is two and one-half inches wide for mounting on the wood base; that leaves a one-half inch space from where the wood base leaves off to where the inside cutting edge of the blade starts. This one-half inch space is important so that the round bulbous blower will not be pushed away from the blade by the wood base.

The prongs, or teeth, of the blade are triangular in shape and start one-half inch from the wood base extending outward to a sharp point; said prongs, or teeth, being ¾ of an inch long. The inside cutting edge of the teeth can be jagged like a hacksaw blade, or just straight, as shown in the drawing, and have a sharp inside point. Each outside point is one-half inch apart. This blade accommodates 13 teeth on each side of its' length.

The one inch metal corner brace 4, of which there are two, connect the handle to the wood base, forming an inverted T shaped handle.

The two #6 size by ½ inch long sheet metal screws 5 are to connect the handle to the wood base through the hole openings in the two metal braces.

The cord strap at the top of the handle 6 is inserted into a ¼ inch hole, ¾ of an inch from the top of the handle, and is about 12 inches long and tied at the ends to form a loop. The cord, after tied, is about four inches long. The strap is to hang the tool on a hook for storage when not in use.

The three #6 size by ¾ inch long sheet metal screws 7 connect the metal blade to the wood base.

I claim:

1. A dandelion cutting tool, for use in removal of dandelion flowers from grass; said tool comprised of an elongated handle member, of rectangular shaped wood for non-sliding grip, a shorter base member attached at the center thereof perpendicularly to one end of the elongated handle member, the handle and base members together forming an inverted T-shaped structure, the underside of the base member being flat; a thin metal blade attached to the underside of the base member, the blade being substantially the same length as the base member, but having a width larger than the base member such that the blade overlaps the base member at each longitudinal side with the overlapped portions being upturned from the edges of the base member toward the handle member at about 5 degrees with respect to the flat underside of the base member, the longitudinal edges of the overlapped portions of the blade each containing an array of sharpened triangular shaped prongs or teeth along the entire length of the blade, the inner ends of the prongs or teeth being spaced a distance of approximately ½ inch from the longitudinal edge on each side of the base member so the dandelion flower is not pushed away from the blade by the wooden base member.

2. The dandelion cutter of claim 1 further comprising a through hole in the other end of the handle member with a strap cord extending through the hole and tied to form a loop to hang tool up on a hook when not in use.

3. The dandelion cutter of claim 1 wherein the blade is flexible so that when the blade is accidentally deformed it may be bent back into its original shape by the operator.

* * * * *